United States Patent
Adam et al.

(10) Patent No.: US 12,401,673 B2
(45) Date of Patent: Aug. 26, 2025

(54) PRIORITIZATION OF ATTACK TECHNIQUES AGAINST AN ORGANIZATION

(71) Applicant: International Business Machines Corporation, Armonk, NY (US)

(72) Inventors: Constantin Mircea Adam, Norwalk, CT (US); Muhammed Fatih Bulut, Auburndale, MA (US); Steven Ocepek, Cuyahoga Falls, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 17/937,854

(22) Filed: Oct. 4, 2022

(65) Prior Publication Data
US 2024/0114046 A1    Apr. 4, 2024

(51) Int. Cl.
*H04L 9/40* (2022.01)

(52) U.S. Cl.
CPC .................. *H04L 63/1433* (2013.01)

(58) Field of Classification Search
CPC ............... G06F 21/552; G06F 21/6245; G06F 2221/034; G06F 21/53; G06F 21/564; H04L 63/1491; H04L 43/062; H04L 41/145; H04L 63/1441; H04L 63/1433; H04L 51/212; H04L 63/1425; H04L 63/1416; H04L 63/1408; H04L 41/0886; H04L 41/0816
See application file for complete search history.

(56) References Cited

U.S. PATENT DOCUMENTS

| | | | |
|---|---|---|---|
| 8,392,997 B2 | 3/2013 | Chen et al. | |
| 8,407,798 B1 | 3/2013 | Lotem et al. | |
| 10,108,803 B2 | 10/2018 | Chari et al. | |
| 10,250,631 B2 | 4/2019 | Sridhara et al. | |
| 10,630,716 B1 | 4/2020 | Ghosh et al. | |
| 10,681,061 B2 | 6/2020 | Jang et al. | |
| 10,749,890 B1 | 8/2020 | Aloisio et al. | |
| 10,873,597 B1 | 12/2020 | Mehra et al. | |
| 10,931,706 B2 | 2/2021 | Sant-Miller et al. | |
| 2021/0352100 A1 | 11/2021 | Baai et al. | |
| 2022/0131887 A1* | 4/2022 | Ngweta et al. | H04L 29/06 |
| 2022/0224724 A1* | 7/2022 | Bazalgette | G06F 21/554 |
| 2023/0370439 A1* | 11/2023 | Crabtree | H04L 63/0428 |

* cited by examiner

*Primary Examiner* — Linglan Edwards
*Assistant Examiner* — Kamryn J Gillespie
(74) *Attorney, Agent, or Firm* — Amin, Turocy & Watson, LLP

(57) ABSTRACT

One or more systems, devices, computer program products and/or computer-implemented methods provided herein relate to prioritization of attack techniques and cyber security events. According to an embodiment, an attack prioritization engine can receive security events, train an artificial intelligence model to rank respective cyber security events as a function of risk, and output a prioritization of security events to address. A mapping component can map asset vulnerabilities to attack techniques. A calculation component can calculate and aggregate scores for respective attack techniques. An attack surface component can extract features from the aggregation of scores to rank attack techniques and determine an attack surface. The mapping component can further map security events to the attack techniques.

20 Claims, 12 Drawing Sheets

```
asset_at_dict = {at₁: [], at₂: [], ... atₓ: [] }
for each asset aⱼ
    at_dict = {at₁: [], at₂: [], ... atₓ: [] }
    Retrieve existing vulnerabilities: v₁, v₂, ..., vₖ
    for each vulnerability vₕ
        Retrieve attack techniques: at₁, at₂, ..., at_L
        for each attack technique at_g calculate score
            score = CVSS * (utility + 1) * (opportune + 1) + wx
            at_dict[at_g].append(score)
    at_dict_maxes = for each attack technique in at_dict   find the "max" value
    for each at_g in at_dict_maxes
        asset_at_dict[at_g].append(at_dict_maxes[at_g])
return asset_at_dict
```

FIG. 6

PRIORITIZATION OF ATTACK TECHNIQUES AGAINST AN ORGANIZATION

BACKGROUND

The subject disclosure relates to computing devices, and more specifically, to prioritizing attack techniques and cyber security events used against an entity to facilitate allocation of security resources.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products are described in accordance with the present invention.

According to an embodiment, a system can comprise a memory that stores computer executable components and a processor that executes the computer executable components stored in the memory. The computer executable components can comprise an attack prioritization engine that receives a plurality of cyber security events, trains an artificial intelligence model to rank respective cyber security events as a function of risk, and outputs a prioritization of security events to address.

According to another embodiment, a computer-implemented method can comprise receiving a plurality of cyber security events; training an artificial intelligence model to rank respective cyber security events as a function of risk; and outputting a prioritization of security events to address.

According to still another embodiment, a computer program product for facilitating prioritization of security events can comprise a computer readable storage medium having program instructions embodied therewith. The program instructions can be executable by a processor to receive a plurality of cyber security events; train an artificial intelligence model to rank respective cyber security events as a function of risk; and output a prioritization of security events to address.

DESCRIPTION OF THE DRAWINGS

FIG. 6 illustrates a non-limiting example of code that facilitates determination of an attack surface for an asset.

DETAILED DESCRIPTION

Figure 1:
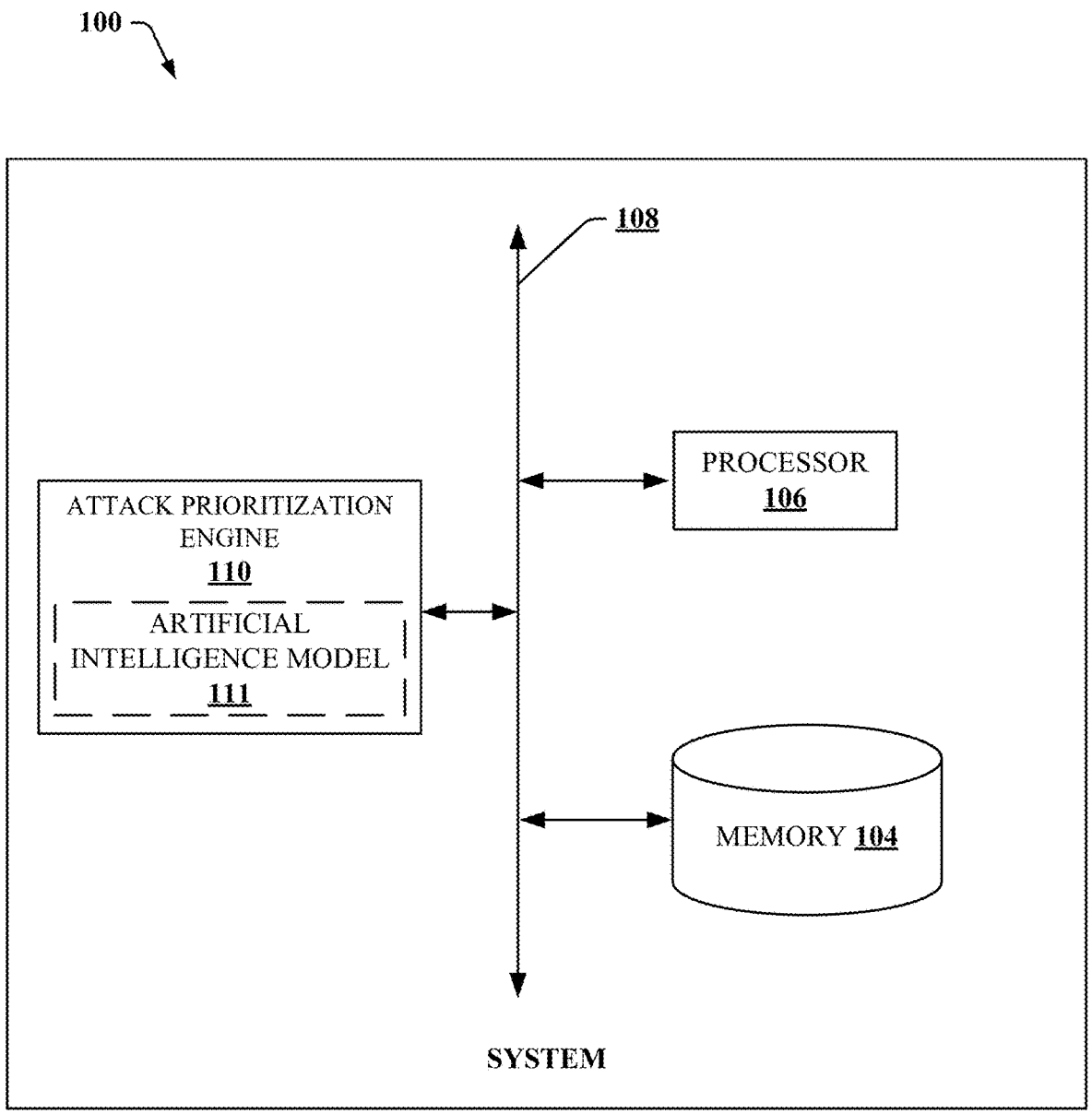
FIG. 1 illustrates a block diagram of an example, non-limiting system that can facilitate prioritization of attack techniques, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Organizations and other entities often have collections of assets that can be vulnerable to cyber attacks. Existing security solutions often identify a large number of security events. For example, a security log may show thousands of flagged security events identified by a security monitoring system. This number of alerts could easily overwhelm a security operator. An operator must make the decision as to which identified events should be ignored and which need a high or low level of attention. This may be a difficult classification for an operator to make because the large number of security events means that the operator will have very little focus to devote to each alarm. Operators may choose to initiate defenses to all identified security events. This slows down performance of a security system and may allocate security resources where they are unnecessary. Alternatively, the operator may choose to focus on a subset of the identified security events to avoid these problems. This, however, risks that the operator will inadvertently overlook real threats to an entity's assets while devoting resources and focus to less relevant alerts. While identifying a large number of potential security threats may minimize the risk that a threatening security event is left unflagged, it can also lead to a threatening security event being lost amongst a large number of less relevant alerts.

State of the art systems may utilize red and blue teams to analyze vulnerabilities in a system, where one team (red) mimics attacks on the system and the other team (blue) attempts to defend the system from those attacks. Hackers perpetrate real attacks on the system using attack techniques. The use of the attack techniques generates security events. Security operators receive events from security event management. The red and blue teams and the security operators operate separately. The present invention removes any such barriers between the red and blue teams and the security operators. Security events are perpetrated by hackers. An attack prioritization engine receives the security events and outputs a prioritized representation of the security events or attack techniques that threaten the assets of an organization or other entity. Both the red and blue teams and the security operators can contribute information to the attack prioritization engine and can receive a prioritized representation of security events.

Security events usually appear because a hostile entity (e.g., a hacker) is trying to perform an attack technique to breach a system and access an organization's or other entity's assets. Types of attack techniques have been categorized and catalogued. For example, the Mitre Attack website serves as a knowledge base for characteristics of attack techniques based on real-world observations. Current knowledge bases of attack techniques, however, do not indicate importance or urgency of particular attack techniques. Software vulnerability knowledge bases such as Common Vulnerabilities Exposures (CVEs) from the National Vulnerability Database offer a catalogue of software vulnerabilities and also offer some indication of risk arising from a particular vulnerability. Levels of risk from a particular attack technique, however, are generally not available.

The present invention identifies the security events that appear, and considers the assets, environment, and systems that are deployed for an organization or other entity to determine what kind of vulnerabilities have occurred on those systems and what the most critical vulnerabilities are. The present invention builds a relationship such as a mapping between the security events and vulnerabilities. The security events that can be tracked to a high-risk vulnerability can be assigned a higher priority than those that are not associated with a high level of vulnerability.

In an embodiment, the present invention can identify vulnerabilities associated with the assets of, for example, an organization. The vulnerabilities can be mapped to the attack techniques. A score can be calculated for each asset and for each attack technique. The scores can be aggregated at different organizational levels. Features can be extracted from the aggregation of scores to facilitate a ranking of the attack techniques and/or a determination of an attack surface. The ranking of the attack techniques and the determination of an attack surface can be performed by artificial intelligence. The ranking of the attack techniques and the determination of an attack surface can be improved by active learning, where the system receives feedback about the outputted prioritizations. The attack techniques can be mapped to security events. The attack prioritization engine can output a prioritization of attack techniques or security events.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however in various cases, that the one or more embodiments can be practiced without these specific details.

One or more embodiments of the subject disclosure is directed to computer processing systems, computer-implemented methods, apparatus and/or computer program products that facilitate efficiently, effectively, and automatically (e.g., without direct human involvement) determining a prioritization of attack techniques and security events as a function of risk to an organization's or other entity's assets. The computer processing systems, computer-implemented methods, apparatus and/or computer program products can employ hardware and/or software to solve problems that are highly technical in nature (e.g.) that are not abstract and that cannot be performed as a set of mental acts by a human.

By way of overview, aspects of systems apparatuses or processes in accordance with the present invention can be implemented as machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

One or more embodiments are now described with reference to the drawings, where like referenced numerals are used to refer to like elements throughout. As used herein, the term "entity" can refer to a machine, device, component, hardware, software, smart device and/or human. In the following description, for purposes of explanation, numerous specific details are set forth in order to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100, 200, 300, and/or 400 as illustrated at FIGS. 1, 2, 3, and 4 and/or systems thereof, can further comprise, be associated with and/or be coupled to one or more computer and/or computing-based elements described herein with reference to an operating environment, such as the operating environment 1200 illustrated at FIG. 12. In one or more described embodiments, computer and/or computing-based elements can be used in connection with implementing one or more of the systems, devices, components and/or computer-implemented operations shown and/or described in connection with FIGS. 1, 2, 3, and/or 4 and/or with other figures described herein.

FIG. 1 illustrates a block diagram of an example, non-limiting system that can facilitate prioritization of attack techniques in accordance with one or more embodiments described herein. As illustrated in FIG. 1, the system 100 can comprise one or more components such as a memory 104, a processor 106, a bus 108, an attack prioritization engine 110, and an artificial intelligence model 111. Generally, system 100 can facilitate prioritization of security events based on identified vulnerabilities and associated attack techniques.

One or more exemplary embodiments of the present invention can comprise an attack prioritization engine 110. In an embodiment, the attack prioritization engine 110 can receive vulnerabilities associated with the assets of an organization or other entity and security events. For example, security events can be detected by security monitoring solutions implemented by an organization or other entity. Security events can be attacks perpetrated by a hostile entity (e.g., a hacker). The attack prioritization engine 110 can train an artificial intelligence model 111 to rank respective cyber security events as a function of risk. The attack prioritization engine 110 can train an artificial intelligence model 111. The training can be based on extrinsic feedback. The attack prioritization engine 110 can output a prioritization of security events to be addressed. The prioritization can be presented to, for example, one or more security operators.

The prioritization can also be presented to red and blue teams. The one or more security operators and/or the red and blue teams can utilize the prioritization of security events to facilitate efficient allocation of security resources.

The various devices (e.g., system 100) and components (memory 104, processor 106, an attack prioritization engine 110, and an artificial intelligence model 111 of system 100) can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

Figure 2:
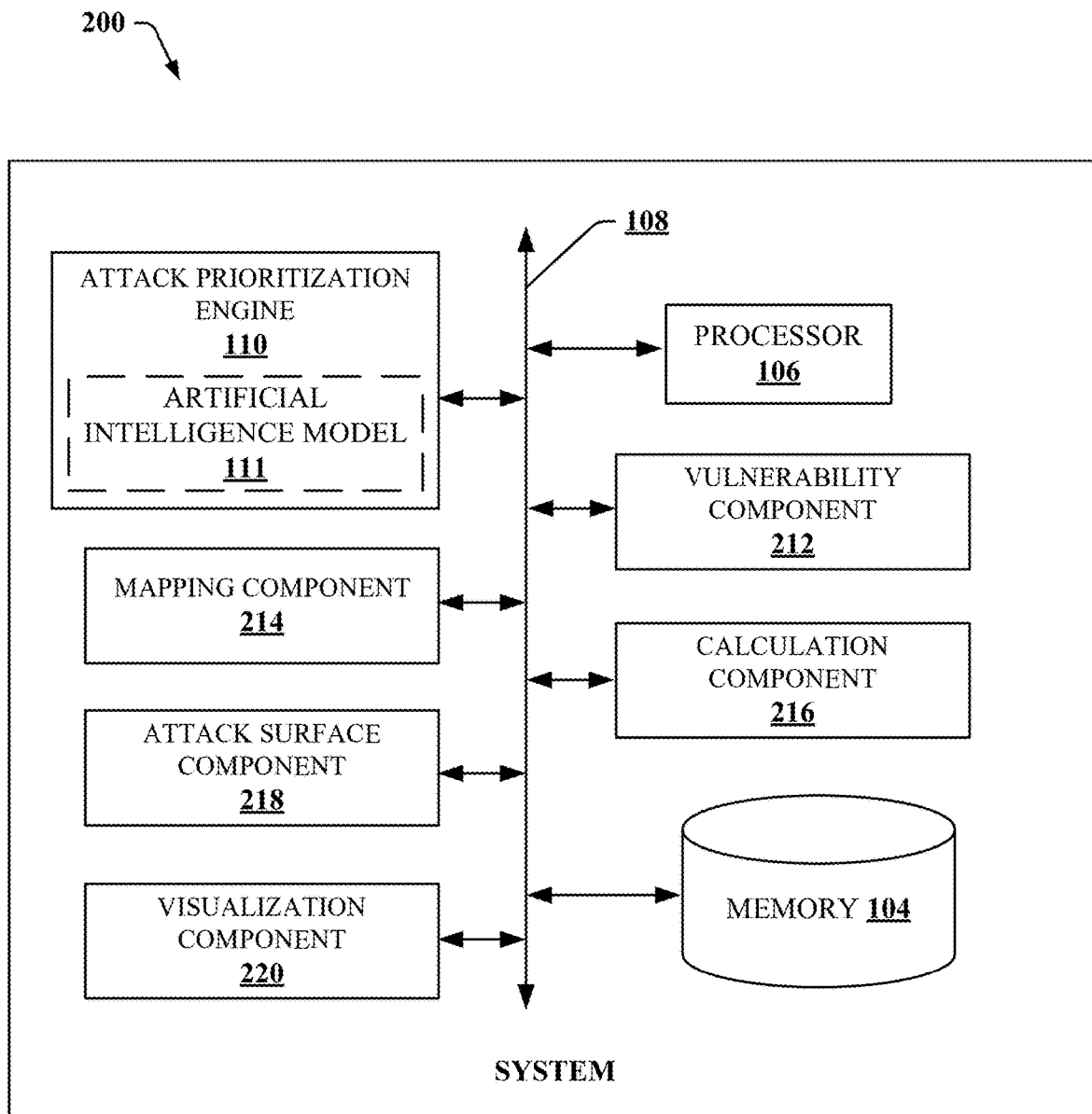
FIG. 2 illustrates another block diagram of an example, non-limiting system that can facilitate prioritization of attack techniques, in accordance with one or more embodiments described herein.

FIG. 2 illustrates a block diagram of an example, non-limiting system that can facilitate prioritization of attack techniques in accordance with one or more embodiments described herein. As illustrated in FIG. 2, the system 200 can comprise one or more components such as a memory 104, a processor 106, bus 108, an attack prioritization engine 110, and an artificial intelligence model 111, a vulnerability component 212, a mapping component 214, a calculation component 216, an attack surface component 218, and a visualization component 220. Generally, system 200 can facilitate prioritization of security events based on identified vulnerabilities and associated attack techniques.

The vulnerability component 212 can identify vulnerabilities associated with the assets of an organization or other entity. The assets can be, for example, applications, servers, hardware, operating systems, or source code. In an embodiment, vulnerabilities can be identified from reports. For example, a vulnerability report can be generated from the activities of the red and blue teams. For example, a vulnerability report could be generated following an adversary simulation or penetration testing. In another example, a vulnerability could be otherwise reported to the system. In another example, vulnerabilities could be identified from the National Vulnerability Database. A vulnerability does not need to be newly reported to be relevant to prioritization. For example, a vulnerability that was reported years ago can still be the source of significant risk to an organization's assets. The vulnerability component 212 can also receive other information regarding the vulnerabilities of the assets. For example, the vulnerability component 212 can receive the Common Vulnerability Scoring System (CVSS) score from the National Vulnerability Database.

The mapping component 214 can map vulnerabilities to attack techniques to determine associated attack techniques. In an embodiment, the mapping can be based at least in part on information received from the National Vulnerability Database. In another embodiment, the mapping can be based at least in part on vulnerability and attack history. The mapping component 214 can further map security events to attack techniques. In an embodiment, the mapping can be based at least in part on attack technique and security event history. In an embodiment, the attack prioritization engine can rank security events based on the ranking and/or attack surface of attack techniques.

The calculation component 216 can calculate scores for attack techniques associated with respective vulnerabilities of the assets based on past and current vulnerabilities and their associated attack techniques. Example code facilitating calculation of scores for attack techniques is described in reference to FIG. 6. The calculation component 216 calculates scores for respective attack techniques associated with respective vulnerabilities of the assets based on past and current vulnerabilities and their associated attack techniques. The calculation component can aggregate the scores according to different organizational levels.

The attack surface component 218 can rank attack techniques to determine an attack surface for assets of an entity. The ranking of attack techniques can be based on features extracted from the aggregation of attack technique scores. The ranking of attack techniques can be carried out by artificial intelligence, such as artificial intelligence 111. In an embodiment the ranking of attack techniques reveals the attack surface for an asset or a group of assets.

The visualization component 220 can generate a visualization of the respective attack techniques as a function of risk relevance. The visualization could be, for example, a grid where each cell represents an attack technique. In another embodiment, the visualization component can generate a visualization of the respective security events as a function of risk relevance. In an embodiment, a visualization can represent varying risk levels with different colors. For example, a high-risk attack technique or security event can be red and a low-risk attack technique or security event can be green. In another example, more colors can represent many varying risk levels. An example visualization is described in reference to FIG. 7.

The various devices (e.g., system 200) and components (memory 104, processor 106, an attack prioritization engine 110, an artificial intelligence model 111, vulnerability component 212, mapping component 214, calculation component 216, attack surface component 218, and visualization component 220 of system 200) can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

Figure 3:
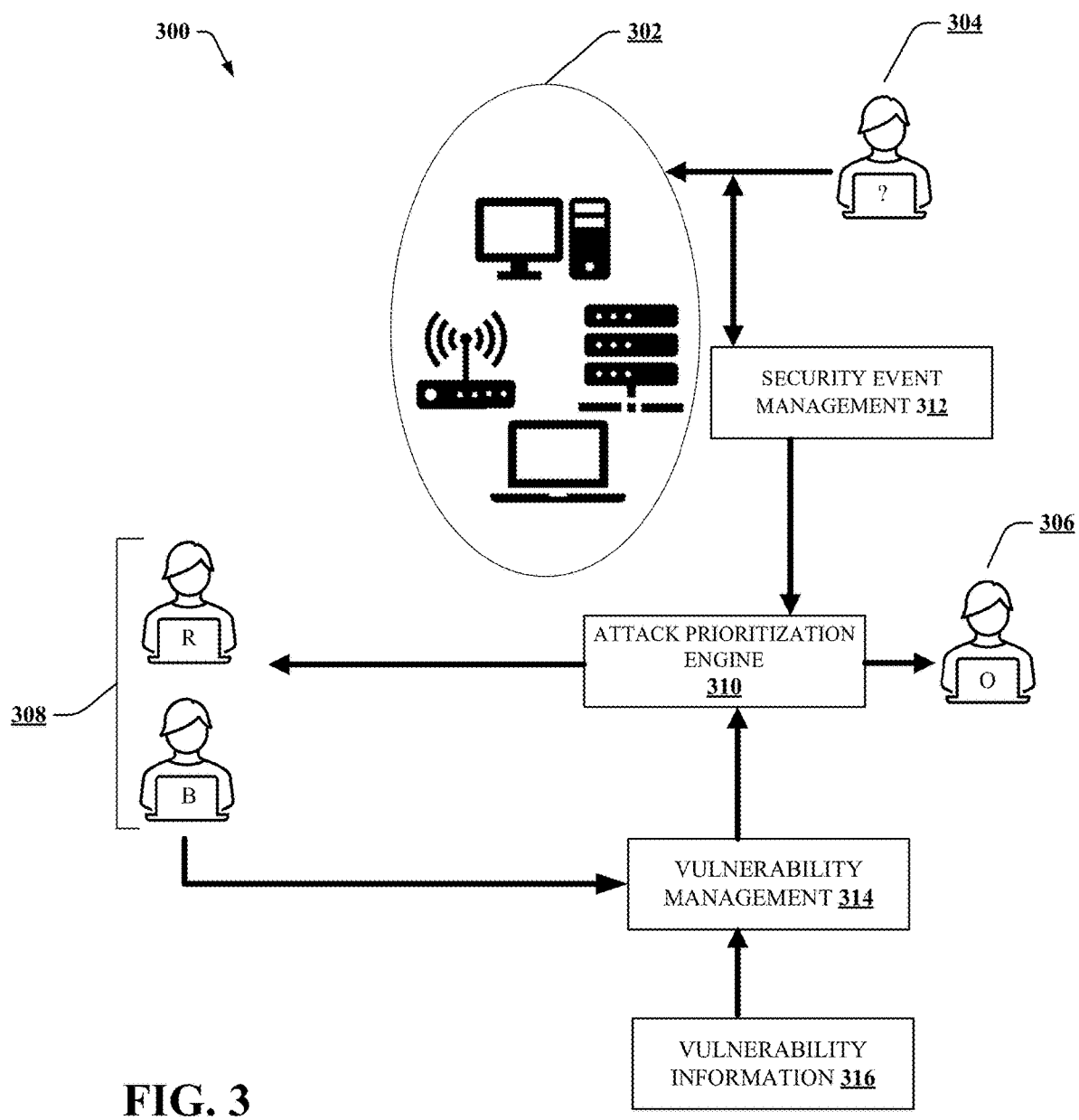
FIG. 3 illustrates another block diagram of an example, non-limiting system that can facilitate prioritization of attack techniques, in accordance with one or more embodiments described herein.

FIG. 3 illustrates a block diagram of an example, non-limiting system that can facilitate prioritization of attack techniques in accordance with one or more embodiments described herein. Repetitive description of like elements and/or processes employed in respective embodiments is omitted for sake of brevity. As indicated previously, description relative to an embodiment of FIGS. 1, 2 and/or 4 can be applicable to an embodiment of FIG. 3. Likewise, description relative to an embodiment of FIG. 3 can be applicable to an embodiment of FIGS. 1, 2 and/or 4.

One or more exemplary embodiments of the present invention can output a prioritization of security events or attack techniques to facilitate optimal allocation of security resources. The system 300 comprises a collection of assets 302 of an organization or other entity. The assets 302 can be, for example, applications, servers, hardware, operating systems, or source code. One or more hostile entities 304 perpetrate attacks on the assets 302 by carrying out attack techniques and generating associated security events. Security event management 312 identifies the security events. The security event management 312 can be one or more security monitoring solutions implemented by the organization or another entity. The vulnerability management 314 can receive vulnerability reports from the red and blue teams 308. The vulnerability management 314 can also receive other reports of vulnerabilities. The vulnerability management 314 can also receive other vulnerability information 316. The vulnerability information 316 can originate from, for example, the National Vulnerability Database. The vulnerability information 316 can comprise, for example, Common Vulnerabilities Exposures (CVEs) or Common Vulnerability Scoring System (CVSS) scores. The attack prioritization engine 310 receives security events from the security event management 312 and vulnerabilities and associated vulnerability information from vulnerability management 314. The attack prioritization engine 310 outputs a prioritized representation of attack techniques or security events. The prioritized representation can be received by the red and blue teams 308. The prioritized representation can be received by one or more security operators 306. The prioritized representation can be for example, a list. In another example, the prioritization can be a visualization, such as a grid. The prioritized representation of attack techniques or security events can facilitate efficient allocation of security resources by the red and blue teams 308 and the one or more security operators 306.

Figure 4:
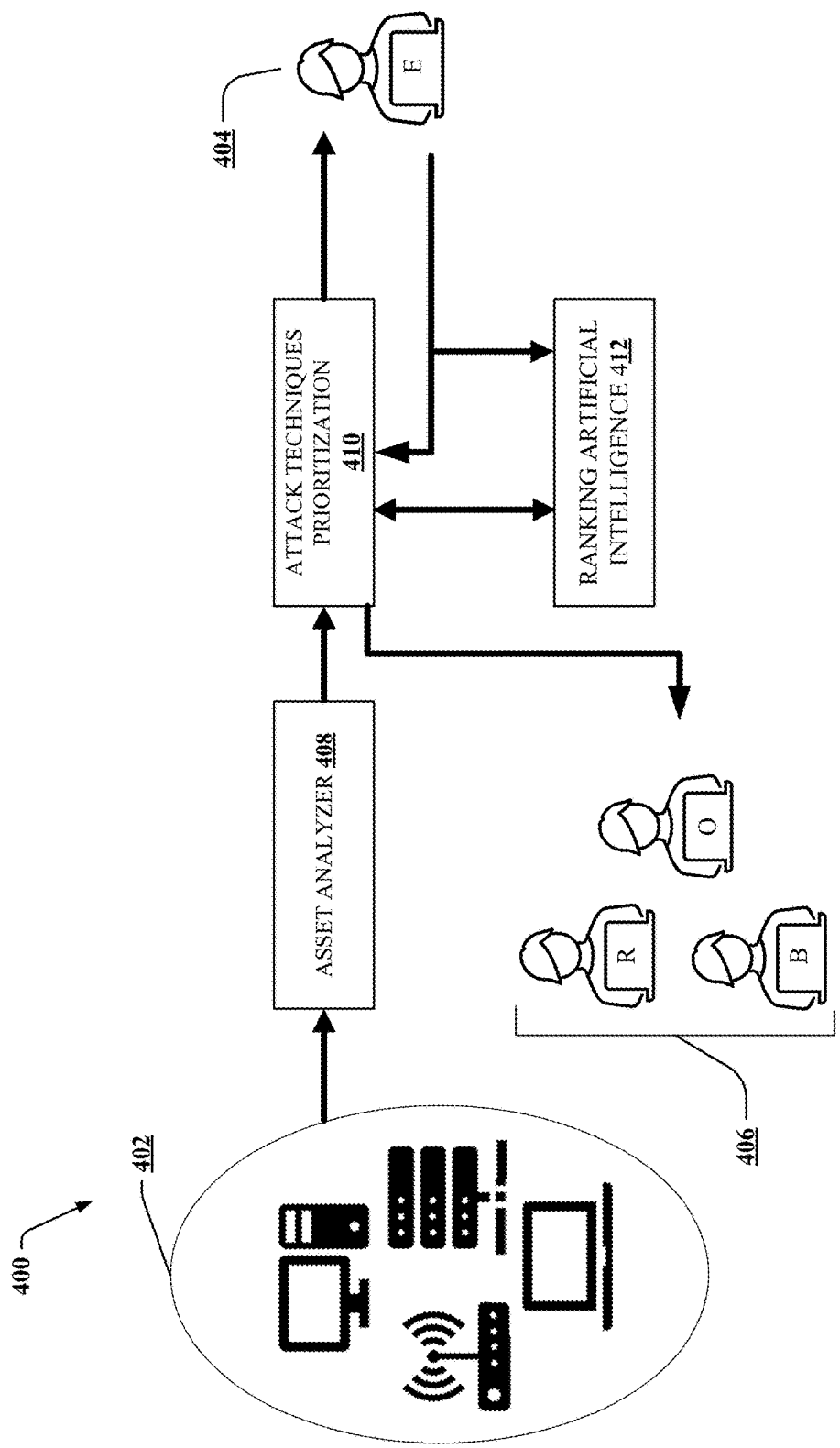
FIG. 4 illustrates another block diagram of an example, non-limiting system that can facilitate prioritization of attack techniques, in accordance with one or more embodiments described herein.

FIG. 4 illustrates a block diagram of an example, non-limiting system that can facilitate prioritization of attack techniques or security events in accordance with one or more embodiments described herein. Repetitive description of like elements and/or processes employed in respective embodiments is omitted for sake of brevity. As indicated previously, description relative to an embodiment of FIGS. 1, 2 and/or 3 can be applicable to an embodiment of FIG. 4. Likewise, description relative to an embodiment of FIG. 4 can be applicable to an embodiment of FIGS. 1, 2 and/or 3.

One or more exemplary embodiments of the present invention can output a prioritization of security events or attack techniques to facilitate efficient allocation of security resources. The system 400 comprises a collection of assets 402 of an organization or other entity. The assets 402 can be, for example, applications, servers, hardware, operating systems, or source code. An asset analyzer 408 can identify assets, security events, and associated vulnerabilities and attack techniques. The asset analyzer 408 can be, for example, a scanner. The asset analyzer 408 can receive vulnerability reports and other vulnerability information. The asset analyzer can receive vulnerability reports from the red and blue teams and/or security operators 406. The asset analyzer 408 can also receive other reports of vulnerabilities. The asset analyzer 408 can also receive other vulnerability information. The vulnerability information can originate from, for example, the National Vulnerability Database. The vulnerability information can comprise, for example, Common Vulnerabilities Exposures (CVEs) or Common Vulnerability Scoring System (CVSS) scores. The asset analyzer 408 can receive security events from, for example, a security monitoring system. The attack prioritization engine 410 receives security events and vulnerabilities and associated vulnerability information from the asset analyzer 408. The attack prioritization engine 410 presents a prioritized representation to one or more subject matter experts 404. The prioritized representation can represent a prioritization of attack techniques and/or a prioritization of security events. In an embodiment, the subject matter experts can be part of the red and blue teams or a security operator. In another embodiment, the subject matter experts 404 do not need to be human. For example, the subject matter experts 404 can be an artificial intelligence model. The subject matter experts 404 can generate feedback for the prioritized representation. The feedback can be used to train a ranking artificial intelligence 412 by active learning. The attack prioritization engine 410 can update the ranking representation using the ranking artificial intelligence 412. The prioritized representation can be received by the red and blue teams and the security operators 406. The prioritized representation can be for example, a list. In another example, the prioritization can be a visualization, such as a grid. The prioritized representation of attack techniques or security events can facilitate efficient allocation of security resources by the red and blue teams and the one or more security operators 406.

Figure 5:
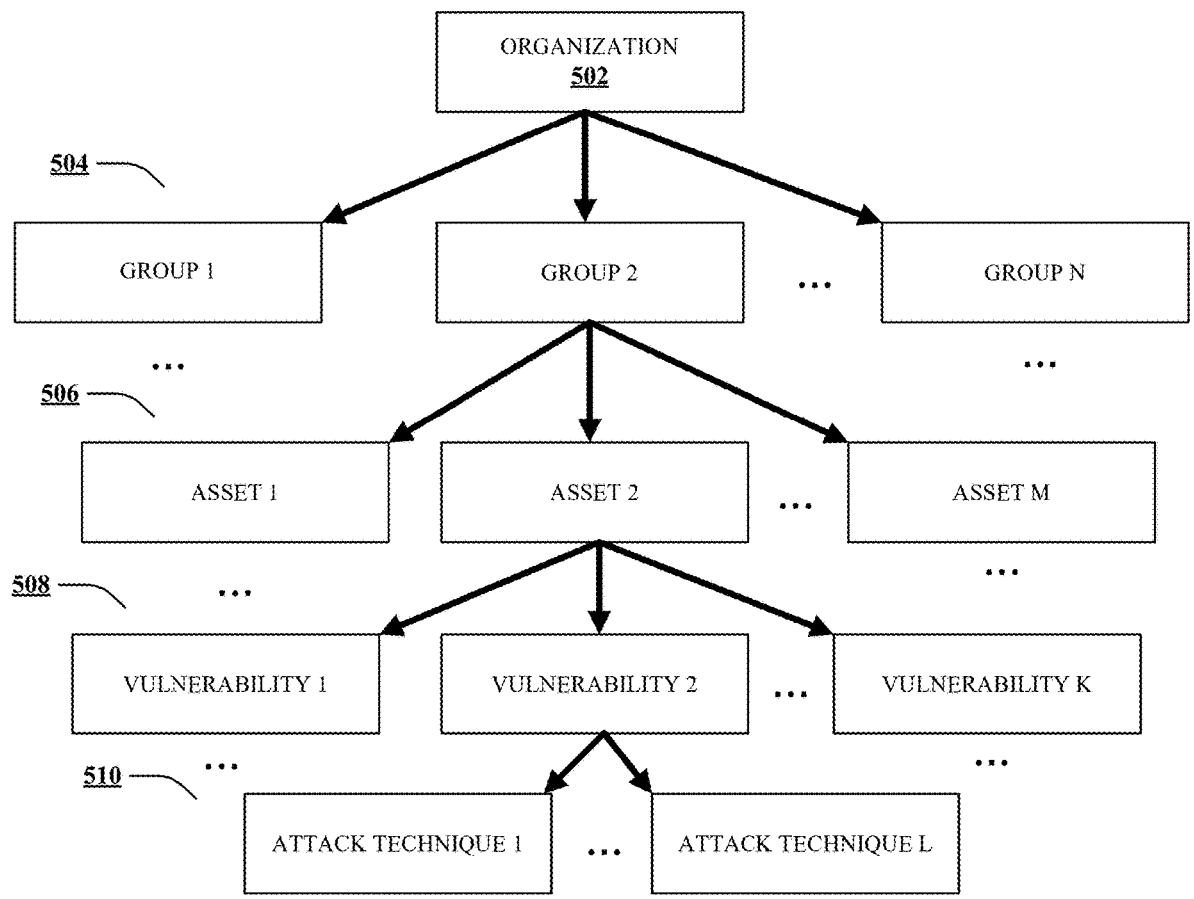
FIG. 5 illustrates a non-limiting example of organizational levels.

FIG. 5 illustrates a non-limiting example of organizational levels. In an embodiment, the systems illustrated in FIGS. 1-4 can operate to protect the assets of an organization 502. The organization 502 can comprise N groups 504 where N is a positive integer. Each of the N groups 504 can comprise M assets 506 where M is a positive integer. Each of the M assets can be associated with K vulnerabilities 508 where K is a positive integer. Each of the K vulnerabilities 508 can be associated with L attack techniques 510 where L is a positive integer.

FIG. 6 illustrates a non-limiting example of code that facilitates determination of an attack surface for an asset. Assets are represented as $a_1, a_2, \ldots a_M$. Vulnerabilities are represented as $v_1, v_2, \ldots v_K$. Attack techniques are represented as $at_1, at_2, \ldots at_L$. At 602, a dictionary of lists is created for an asset, where a list of scores can be associated with each attack technique. At 604, associated vulnerabilities are retrieved for the asset. In an embodiment, the vulnerabilities originated from vulnerability reports. At 606, associated attack techniques are retrieved for each associated vulnerability. In an embodiment, attack techniques are associated with a vulnerability by mapping. At 608, a score is calculated for each attack technique. The score can be based in part on a CVSS score extracted from the National Vulnerability Database. The score can also be based in part on a score associated with the utility and/or opportunity for an attack technique. The score calculation at 608 is one example of risk calculation for an attack technique, however, any risk calculation could be substituted. The score for each attack technique can be saved in the dictionary of lists created for an asset. At 610, the maximum score for each attack technique is identified. In an embodiment, an asset can have multiple vulnerabilities associated with the same attack technique. The attack technique may result in a score indicating a critical level of risk for one vulnerability of the asset and a score indicating a high level of risk for another vulnerability of the same asset. Identifying the maximum score facilitates assigning a critical risk score for that attack technique for the subject asset. For another example, the attack technique may result in a score indicating a medium level of risk for one vulnerability of the asset and a score indicating a low level of risk for another vulnerability of the same asset. Identifying the maximum score facilitates assigning a medium risk score for that attack technique for the subject asset.

The dictionary of lists of attack technique scores can be aggregated at any organizational level, such as a group of assets. The dictionary of lists of attack technique scores serves as an aggregation of scores from which features can be extracted. For example, the following features can be extracted: number of servers with attack surface, critical category scores count, critical category scores percentage, high category scores counts, high category scores percentage, medium category scores count, medium category scores percentage, low category scores count, low category scores percentage, and number of past attacks. In other embodiments, there may be fewer, more, or different risk categories.

In an embodiment, the extracted features can be used to rank the attack techniques. For example, the ranking can use artificial intelligence.

Figure 7:
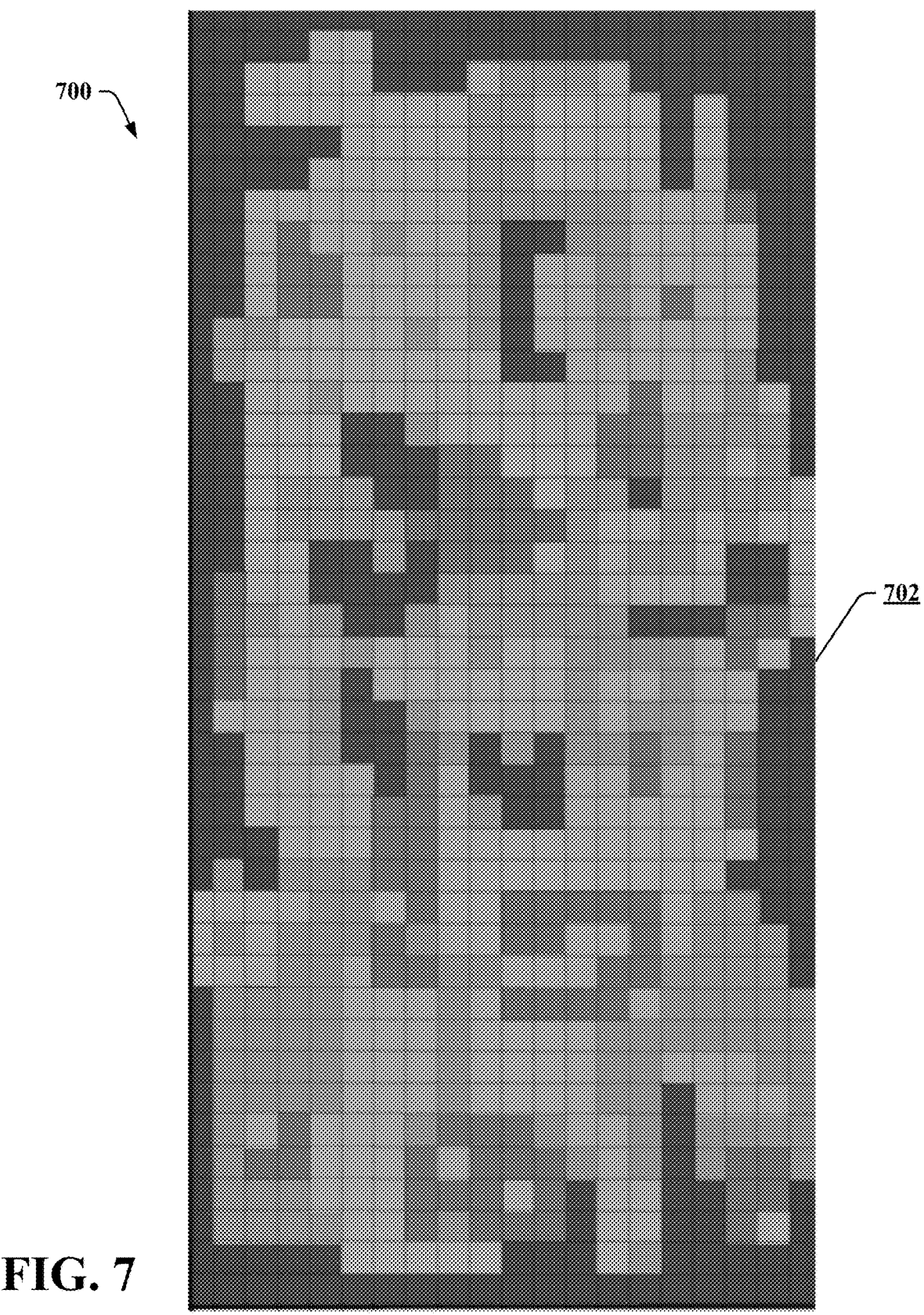
FIG. 7 illustrates a non-limiting example of a visualization of a prioritization.

FIG. 7 illustrates a non-limiting example of a visualization of an attack surface. The visualization 702 represents prioritization levels for multiple attack techniques or security events. In an embodiment, the visualization component can generate a visualization of the respective security events as a function of risk relevance. In an embodiment, a visualization can represent varying risk levels with different colors. For example, a critical-risk attack technique or security event can be red and a low-risk attack technique or security event can be green. In another example, more colors can represent many varying risk levels. In an embodiment, the visualization could be organized so that critical level techniques or events are at the top of the visualization and low level techniques or events are at the bottom of the visualization.

Figure 8:
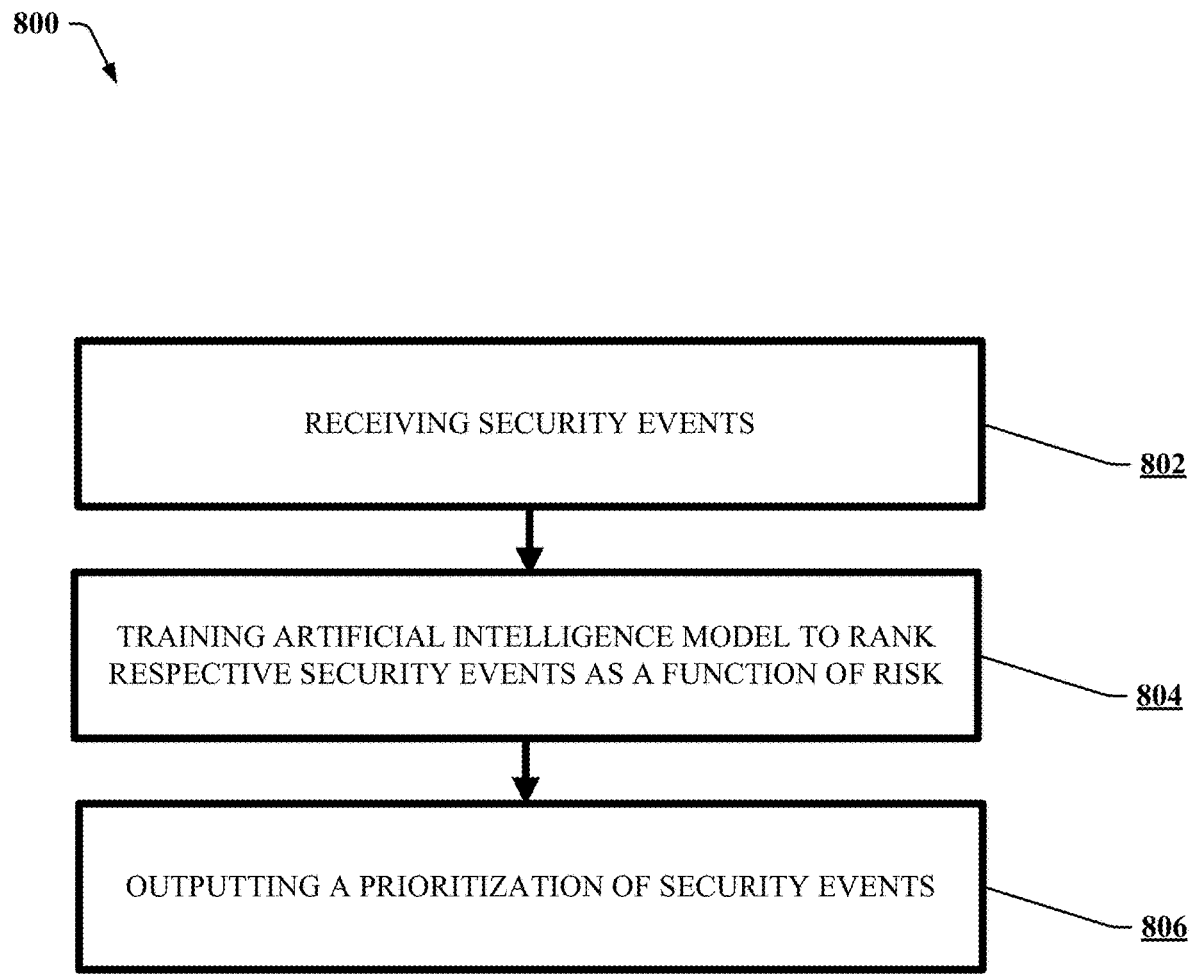
FIG. 8 illustrates a flow diagram of an example, non-limiting computer-implemented method in accordance with one or more embodiments described herein.

FIG. 8 illustrates a flow diagram of an example, non-limiting method 800 that can facilitate prioritization of cyber security events, in accordance with one or more embodiments described herein, such as the non-limiting system 100 of FIG. 1. While the non-limiting method 800 is described relative to the non-limiting system 100 of FIG. 1, the non-limiting method 800 can be applicable also to other systems described herein, such as the non-limiting system 200 of FIG. 2 and/or the non-limiting system 300 of FIG. 3 and/or the non-limiting system 400 of FIG. 4. Repetitive description of like elements and/or processes employed in respective embodiments is omitted for sake of brevity.

At 802, the non-limiting method 800 can comprise receiving, by a system (e.g., attack prioritization engine 110) security events. At 804, the non-limiting method 800 can comprise training, by the system (e.g., attack prioritization engine 110) an artificial intelligence model (e.g., artificial intelligence model 111) to rank respective security events as a function of risk. At 806, the non-limiting method 800 can comprise outputting, by a system (e.g., attack prioritization engine 110) a prioritization of security events.

Figure 9:
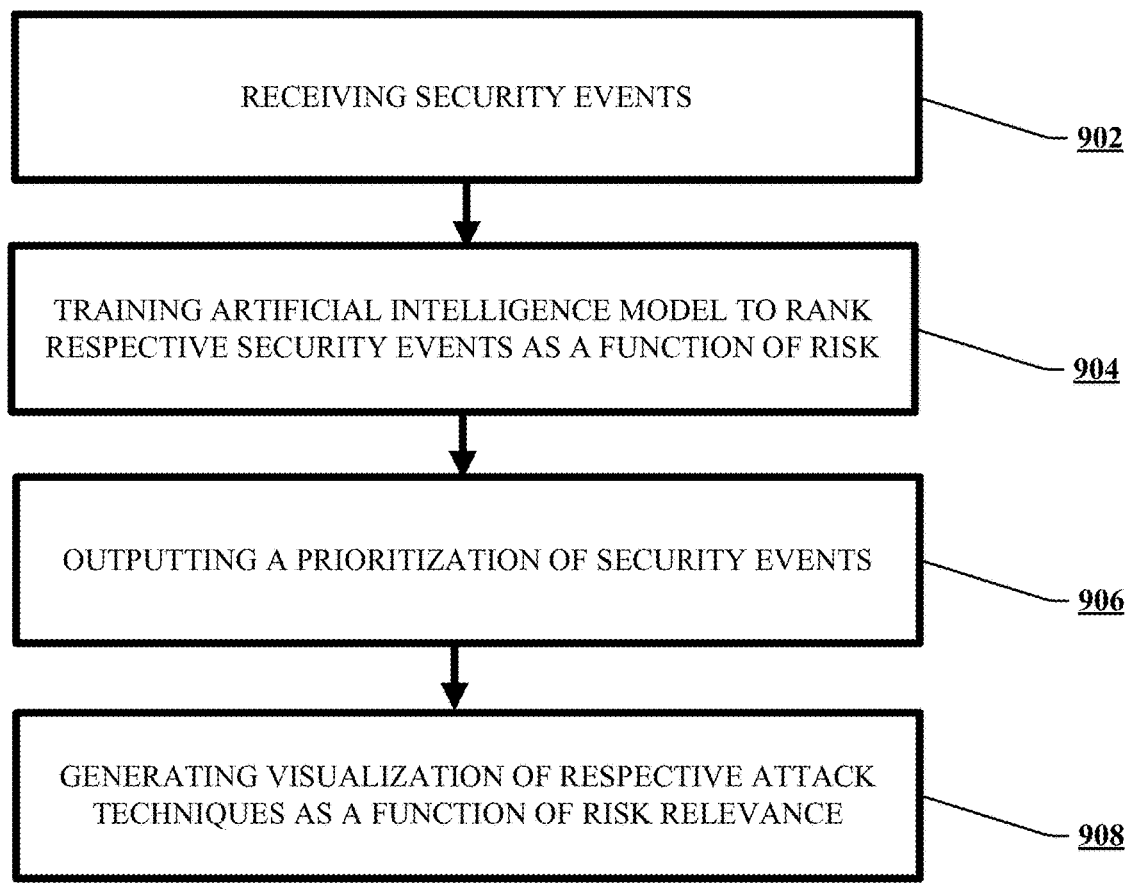
FIG. 9 illustrates a flow diagram of an example, non-limiting computer-implemented method in accordance with one or more embodiments described herein.

FIG. 9 illustrates a flow diagram of an example, non-limiting method 900 that can facilitate prioritization of cyber security events, in accordance with one or more embodiments described herein, such as the non-limiting system 200 of FIG. 2. While the non-limiting method 900 is described relative to the non-limiting system 200 of FIG. 2, the non-limiting method 900 can be applicable also to other systems described herein, such as the non-limiting system 100 of FIG. 1 and/or the non-limiting system 300 of FIG. 3 and/or the non-limiting system 400 of FIG. 4. Repetitive description of like elements and/or processes employed in respective embodiments is omitted for sake of brevity.

At 902, the non-limiting method 900 can comprise receiving, by a system (e.g., attack prioritization engine 110) security events. At 904, the non-limiting method 900 can comprise training, by the system (e.g., attack prioritization engine 110) an artificial intelligence model (e.g., artificial intelligence model 111) to rank respective security events as a function of risk. At 906, the non-limiting method 900 can comprise outputting, by a system (e.g., attack prioritization engine 110) a prioritization of security events. At 908, the non-limiting method 900 can comprise generating, by the system (e.g., the visualization component 220) visualization of respective attack techniques as a function of risk relevance.

Figure 10:
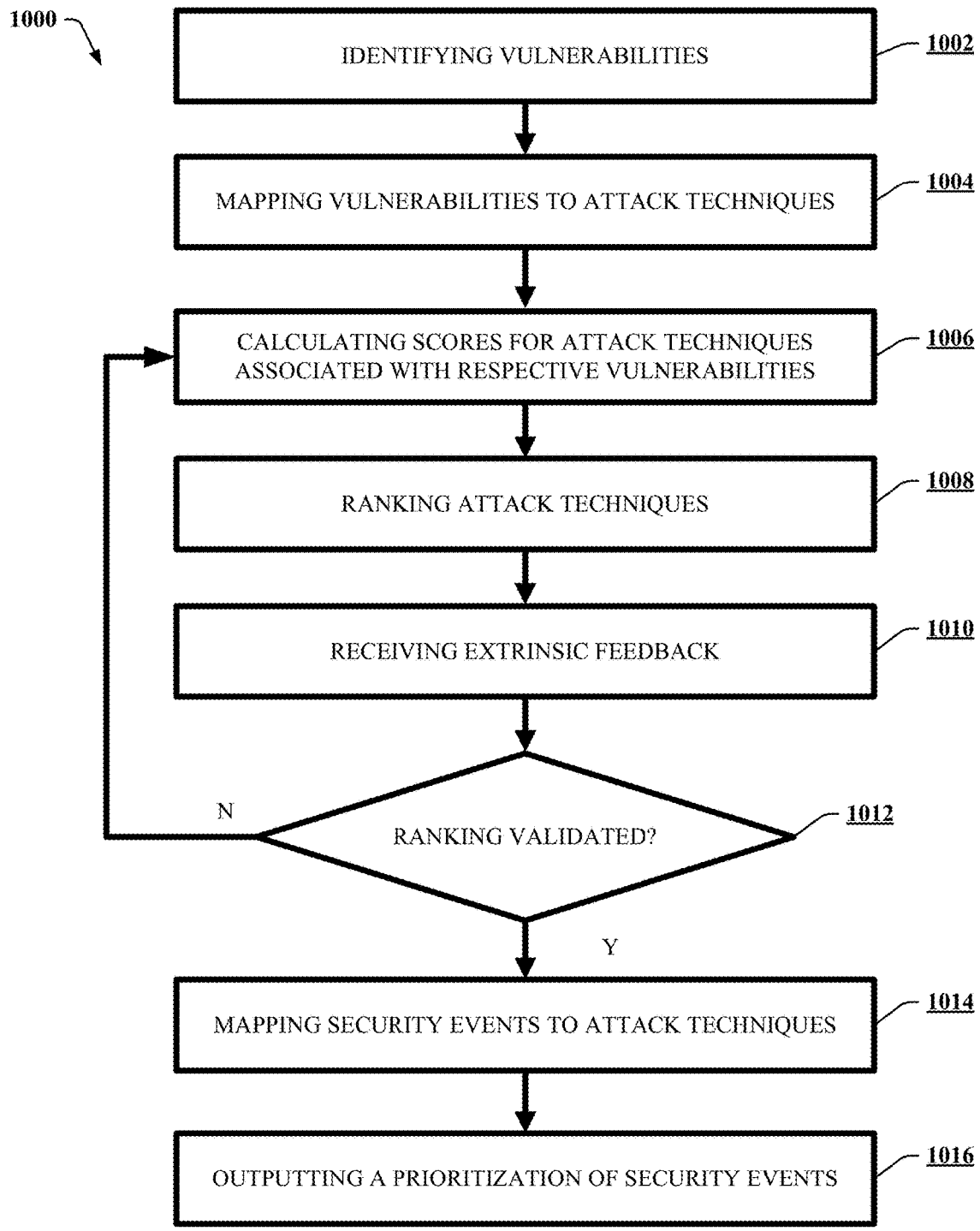
FIG. 10 illustrates a flow diagram of an example, non-limiting computer-implemented method in accordance with one or more embodiments described herein.
Figure 11:
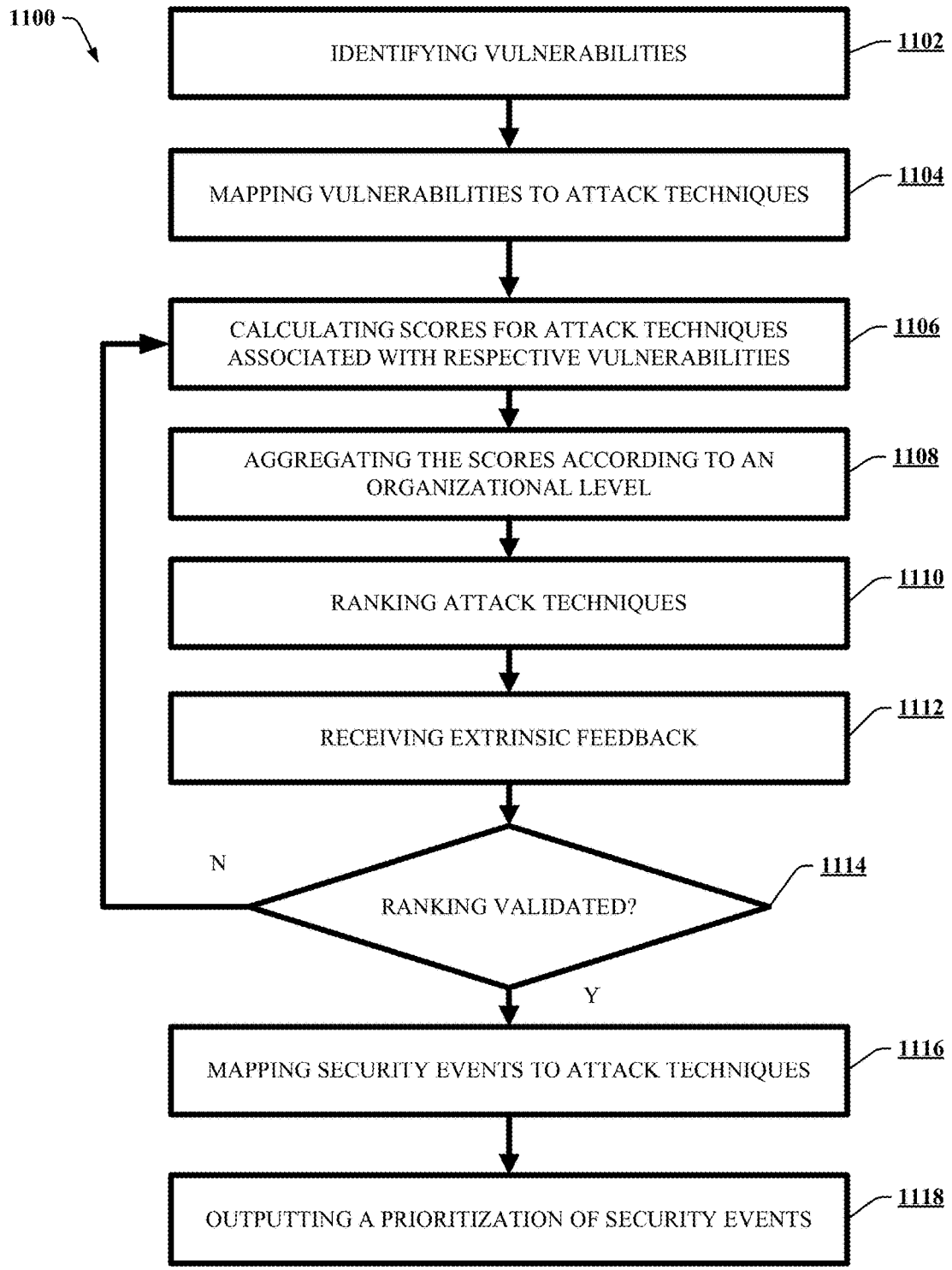
FIG. 11 illustrates a flow diagram of an example, non-limiting computer-implemented method in accordance with one or more embodiments described herein.

FIG. 10 illustrates a flow diagram of an example, non-limiting method 1000 that can facilitate prioritization of cyber security events, in accordance with one or more embodiments described herein, such as the non-limiting system 200 of FIG. 2. While the non-limiting method 1000 is described relative to the non-limiting system 200 of FIG. 2, the non-limiting method 1000 can be applicable also to other systems described herein, such as the non-limiting system 100 of FIG. 1 and/or the non-limiting system 300 of FIG. 3 and/or the non-limiting system 400 of FIG. 4. Repetitive description of like elements and/or processes employed in respective embodiments is omitted for sake of brevity.

At 1002, the non-limiting method 1000 can comprise identifying, by a system (e.g., vulnerability component 212) vulnerabilities. At 1004, the non-limiting method 1000 can comprise mapping, by the system (e. g., mapping component 214) vulnerabilities to attack techniques. At 1006, the non-limiting method 1000 can comprise calculating, by the system (e.g., calculation component 216) scores for attack techniques associated with respective vulnerabilities. At 1008, the non-limiting method 1000 can comprise ranking, by the system (e.g., attack surface component 218) attack techniques. At 1010, the non-limiting method 1000 can comprise receiving, by the system (e.g., attack prioritization engine 110) extrinsic feedback. At 1012, the non-limiting method 1000 can determine if the extrinsic feedback validates the ranking. If so, the non-limiting method 1000 can proceed to 1014. If not, the non-limiting method 1000 can proceed to step 1006. At 1014, the non-limiting method 1000 can comprise mapping, by the system (e.g., mapping component 214) security events to attack techniques. At 1016, the non-limiting method 1000 can comprise outputting, by the system (e.g., by the attack prioritization engine 110) a prioritization of security events.

At 1102, the non-limiting method 1100 can comprise identifying, by a system (e.g., vulnerability component 212) vulnerabilities. At 1104, the non-limiting method 1100 can comprise mapping, by the system (e. g., mapping component 214) vulnerabilities to attack techniques. At 1106, the non-limiting method 1000 can comprise calculating, by the system (e.g., calculation component 216) scores for attack techniques associated with respective vulnerabilities. At 1108, the non-limiting method 1100 can comprise aggregating, by the system (e.g., the calculation component 216) the scores according to an organizational level. At 1110, the non-limiting method 1100 can comprise ranking, by the system (e.g., attack surface component 218) attack techniques. At 1112, the non-limiting method 1100 can comprise receiving, by the system (e.g., attack prioritization engine 110) extrinsic feedback. At 1114, the non-limiting method 1100 can determine if the extrinsic feedback validates the ranking. If so, the non-limiting method 1100 can proceed to 1116. If not, the non-limiting method 1100 can proceed to step 1106. At 1116, the non-limiting method 1100 can comprise mapping, by the system (e.g., mapping component 214) security events to attack techniques. At 1118, the non-limiting method 1100 can comprise outputting, by the system (e.g., by the attack prioritization engine 110) a prioritization of security events.

Figure 12:
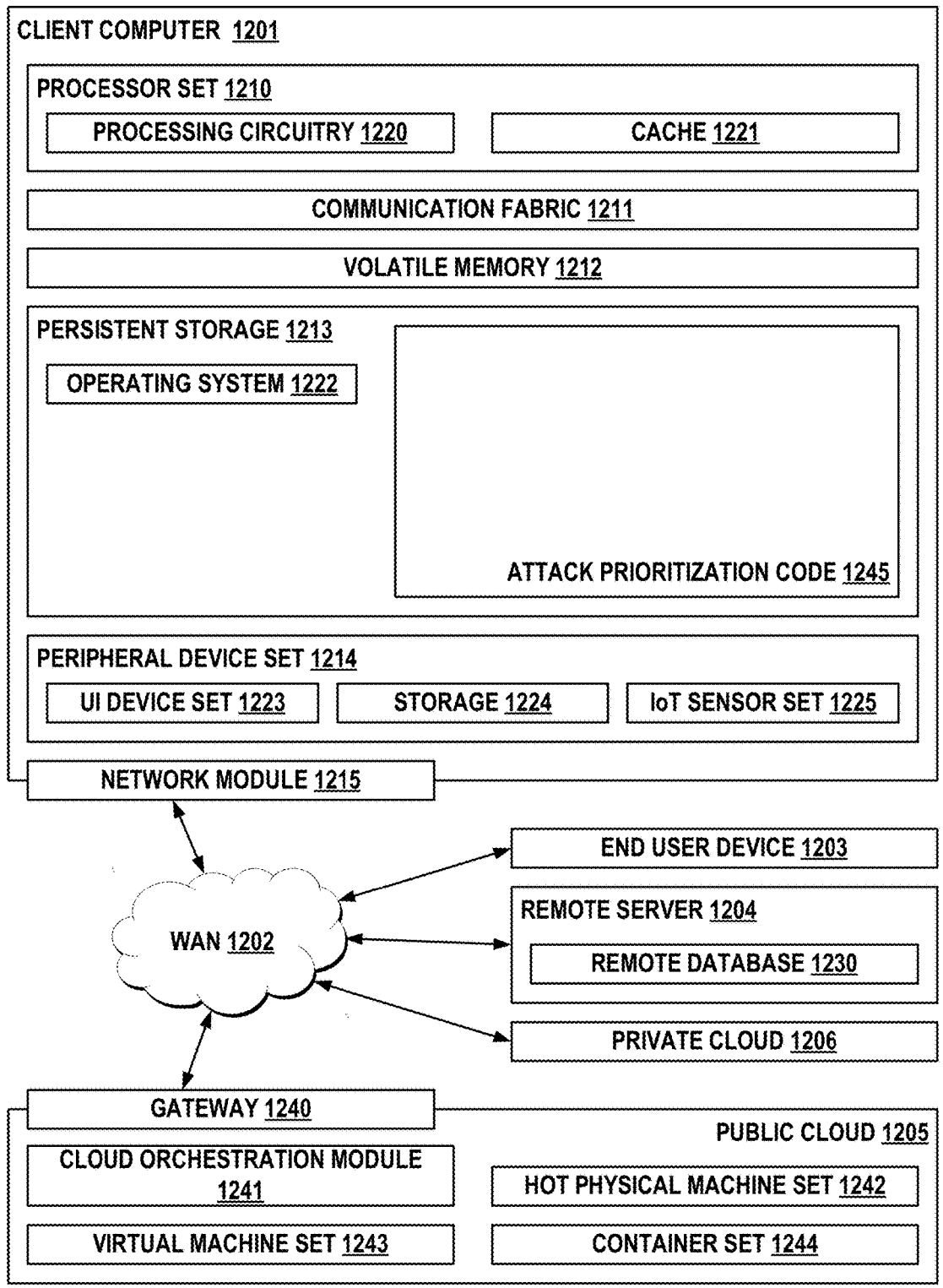
FIG. 12 illustrates a block diagram of an example, computing environment in which one or more embodiments described herein can be facilitated.

Turning next to FIG. 12, a detailed description is provided of additional context for the one or more embodiments described herein at FIGS. 1-11.

FIG. 12 and the following discussion are intended to provide a brief, general description of a suitable computing environment 1200 in which one or more embodiments described herein at FIGS. 1-11 can be implemented. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1200 contains an example of an environment for the execution of at least some of the computer code involved in performing the inventive methods, such as attack prioritization code 1245. In addition to block 1245, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1245, as identified above), peripheral device set 1214 (including user interface (UI), device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible. Computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 1245 in persistent storage 1213.

COMMUNICATION FABRIC 1211 is the signal conduction paths that allow the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, the volatile memory is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid state storage devices. Operating system 1222 may take several forms, such as various known proprietary operating systems or open source Portable Operating System Interface type operating systems that employ a kernel. The code included in block 1245 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. IoT sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes at least one of the computer executable components that:
receives a plurality of cyber security events associated with an organization; and
trains an artificial intelligence model to rank respective cyber security events of the plurality of cyber security events as a function of risk, and output a prioritization of a subset of the plurality of cyber security events to address based on the rankings, wherein the training comprises:
generating a first mapping of vulnerabilities of assets of the organization to attack techniques:
for each attack technique of the attack techniques:
for each asset of the vulnerabilities of the assets mapped to the attack technique:
determining a respective risk score for each vulnerability of the asset mapped to the attack technique,
determining a highest risk score of the respective risk scores for the vulnerabilities of the asset mapped to the attack technique,
assigning the highest risk score as a respective critical risk score for the attack technique for the asset,
ranking the attack techniques based on the respective critical risk scores for the attack techniques for the assets;
generating a second mapping of the respective cyber security events to the attack techniques; and
training the artificial intelligence model to generate the rankings of the respective cyber security events based on the first mapping, the second mapping, and the rankings of the attack techniques.

2. The system of claim 1, wherein the training further comprises determining an attack surface for the assets based on the rankings of the attack techniques.

3. The system of claim 1, wherein the training further comprises identifying the vulnerabilities of the assets.

4. The system of claim 1, wherein the outputting further comprises generating a visualization of the attack techniques as a function of risk relevance.

5. The system of claim 1, wherein the training further comprises ranking the attack techniques based further on extracted features from the first mapping.

6. The system of claim 5, wherein the training further comprises:
aggregating the respective risk scores according to different organizational levels of the assets, and
extracting the features based on the aggregation on the respective risk scores.

7. The system of claim 1, wherein the training further comprises:
receiving extrinsic feedback, and
determining whether the extrinsic feedback validates the rankings of the respective cyber security events.

8. A computer-implemented method, comprising:
receiving, by a system comprising a processor, a plurality of cyber security events associated with an organization; and
training, by the system, an artificial intelligence model to rank respective cyber security events of the plurality of cyber security events as a function of risk and output a prioritization of a subset of the plurality of cyber security events to address based on the rankings, wherein the training comprises:
generating, by the system, a first mapping of vulnerabilities of assets of the organization to attack techniques;
for each attack technique of the attack techniques:
for each asset of the vulnerabilities of the assets mapped to the attack technique:
determining a respective risk score for each vulnerability of the asset mapped to the attack technique,
determining a highest risk score of the respective risk scores for the vulnerabilities of the asset mapped to the attack technique,
assigning the highest risk score as a respective critical risk score for the attack technique for the asset,
ranking the attack techniques based on the respective critical risk scores for the attack techniques for the assets;

generating, by the system, a second mapping of the respective cyber security events to the attack techniques; and training, by the system, the artificial intelligence model to generate the rankings of the respective cyber security events based on the first mapping, the second mapping, and the rankings of the attack techniques.

9. The computer-implemented method of claim 8, wherein the outputting further comprises:

determining, by the system, an attack surface for the assets based on the rankings of the attack techniques.

10. The computer-implemented method of claim 8, wherein the outputting further comprises:

generating, by the system, a visualization of the attack techniques as a function of risk relevance.

11. The computer-implemented method of claim 8, wherein the training further comprises:

ranking, by the system, the attack techniques based further on extracted features from the first mapping.

12. The computer-implemented method of claim 11, wherein the training further comprises:

aggregating the respective risk scores according to different organizational levels of the assets, and extracting the features based on the aggregation on the respective risk scores.

13. The computer-implemented method of claim 8, wherein the training further comprises:

receiving extrinsic feedback, and determining whether the extrinsic feedback validates the rankings of the respective cyber security events.

14. The computer-implemented method of claim 8, wherein the training further comprises-identifying the vulnerabilities of the assets.

15. A computer program product facilitating prioritization of security events, the computer program product comprising a computer readable storage medium having program instructions embodied therewith, the program instructions executable by a processor to cause the processor to:

receive a plurality of cyber security events associated with an organization; and train an artificial intelligence model to rank respective cyber security events as a function of risk and output a prioritization of a subset of the plurality of cyber security events to address based on the rankings, wherein the training comprises:

generating a first mapping of vulnerabilities of assets of the organization to attack techniques;

for each attack technique of the attack techniques:

for each asset of the vulnerabilities of the assets mapped to the attack technique:

determining a respective risk score for each vulnerability of the asset mapped to the attack technique, determining a highest risk score of the respective risk scores for the vulnerabilities of the asset mapped to the attack technique, assigning the highest risk score as a respective critical risk score for the attack technique for the asset, ranking the attack techniques based on the respective critical risk scores for the attack techniques for the assets;

generating a second mapping of the respective cyber security events to the attack techniques; and training the artificial intelligence model to generate the rankings of the respective cyber security events based on the first mapping, the second mapping, and the rankings of the attack techniques.

16. The computer program product of claim 15, wherein the outputting further comprises:

determining an attack surface for the assets based on the rankings of the attack techniques.

17. The computer program product of claim 15, wherein the training further comprises:

ranking the attack techniques based further on extracted features from the first mapping.

18. The computer program product of claim 15, wherein the training further comprises:

receiving extrinsic feedback, and determining whether the extrinsic feedback validates the rankings of the respective cyber security events.

19. The computer program product of claim 17, wherein the training further comprises:

aggregating the respective risk scores according to different organizational levels of the assets, and extracting the features based on the aggregation on the respective risk scores.

20. The computer program product of claim 15, wherein the training further comprises identifying the vulnerabilities of the assets.

* * * * *